United States Patent [19]
Yang et al.

[11] Patent Number: 5,414,700
[45] Date of Patent: May 9, 1995

[54] NEGOTIATION PROTOCOL FOR ESTABLISHMENT OF FULL DUPLEX COMMUNICATION ON A TOKEN RING NETWORK

[75] Inventors: Henry S. Yang, Andover; Barry A. Spinney, Wayland; William R. Hawe, Pepperell; Luc A. Pariseau, Arlington, all of Mass.

[73] Assignee: Digital Equipment Corp., Maynard, Mass.

[21] Appl. No.: 226,423

[22] Filed: Apr. 12, 1994

Related U.S. Application Data

[60] Continuation of Ser. No. 966,110, Oct. 23, 1992, abandoned, which is a continuation-in-part of Ser. No. 893,217, Jun. 2, 1992, abandoned, which is a division of Ser. No. 468,480, Jan. 22, 1990, Pat. No. 5,155,726.

[51] Int. Cl.$^6$ .......................... H04J 3/02; H04L 12/28
[52] U.S. Cl. .................................... 370/24; 370/85.5; 370/29
[58] Field of Search .................. 370/85.4, 85.5, 29, 370/24, 31; 340/825.05

[56] References Cited

U.S. PATENT DOCUMENTS

| | | | |
|---|---|---|---|
| 4,747,100 | 5/1988 | Roach et al. | 370/85.5 |
| 5,121,382 | 6/1992 | Yang et al. | 370/31 |
| 5,155,726 | 10/1992 | Spinney et al. | 370/85.5 |

OTHER PUBLICATIONS

American National Standards Institute, ANSI X3.139-1987, 1987, New York, N.Y., "fiber distributed data interface (FDDI)-token ring media access control (MAC)".
American National Standards Institute, ANSI X3.148-1988, 1988, New York, N.Y., "fiber distributed data interface (FDDI)-token ring physical layer protocol (PHY)".
Proposed American National Standard, X3T9/92-067, X3T9.5/84-49, Rev. 7.2, Jun. 25, 1992, "FDDI Station Management (SMT)".
American National Standards Institute, ANSI X3.166-1990, 1990, New York, N.Y., "Fibre Data Distributed Interface (FDDI)-Token Ring Physical Layer Medium Dependent (PMD)".

*Primary Examiner*—Douglas W. Olms
*Assistant Examiner*—Min Jung
*Attorney, Agent, or Firm*—A. Sidney Johnston; Noel F. Heal

[57] ABSTRACT

A technique for establishing and maintaining full duplex communication between two stations connected to a token ring network, without physically reconfiguring the station connections or otherwise disturbing the network. Each station continually performs a two node test to ascertain whether there are only two active stations on the network, and updates a two node flag that indicates whether or only two active stations are present. The two node test uses both upstream neighbor and downstream neighbor addresses to update the two node flag, and requires validation of either one of these addresses if the other one of them appears to have changed since the previous observation. A concurrently running full duplex control process uses the two node flag and other conditions to decide whether to initiate or continue transition to full duplex mode. The control process uses an exchange of full duplex request and acknowledgment frames and completes the transition to full duplex mode when each station has transmitted and received a Restricted Token.

20 Claims, 10 Drawing Sheets

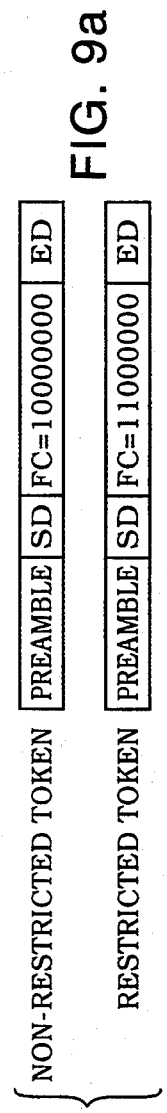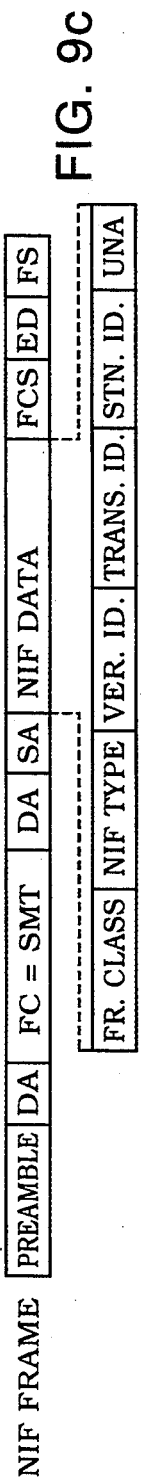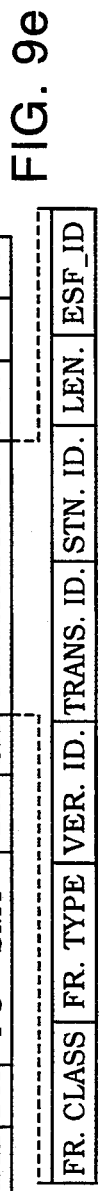

FIG. 9a
FIG. 9b
FIG. 9c
FIG. 9d
FIG. 9e
FIG. 9f

NON-RESTRICTED TOKEN | PREAMBLE | SD | FC=10000000 | ED
RESTRICTED TOKEN | PREAMBLE | SD | FC=11000000 | ED
STANDARD FRAME | PREAMBLE | DA | FC=FR TYPE | DA | SA | DATA | FCS | ED | FS
NIF FRAME | PREAMBLE | DA | FC = SMT | DA | SA | NIF DATA | FCS | ED | FS
FR. CLASS | NIF TYPE | VER. ID. | TRANS. ID. | STN. ID. | UNA
REQUEST FDX | PREAMBLE | DA | FC = SMT | DA | SA | FDX REQ. INFO. | FCS | ED | FS
FR. CLASS | FR. TYPE | VER. ID. | TRANS. ID. | STN. ID. | LEN. | ESF_ID
ACK FDX | PREAMBLE | DA | FC = SMT | DA | SA | FDX ACK INFO. | FCS | ED | FS
FR. CLASS | FR. TYPE | VER. ID. | TRANS. ID. | STN. ID. | LEN. | ESF_ID

FR. CLASS : FRAME CLASS
FR. TYPE : FRAME TYPE
VER. ID. : VERSION ID. (CONSTANT)
TRANS. ID. : TRANSACTION ID.
STN. ID. : STATION ID.
LEN. : LENGTH OF ESF_ID. FIELD
ESF_ID : EXTENDED SERVICE FRAME ID.
  = 1000D40300 FOR FDX REQUEST
  = 1000D40400 FOR FDX ACK

SD : STARTING DELIMITER
FC : FRAME CONTROL
ED : ENDING DELIMITER
DA : DESTINATION ADDRESS
SA : SOURCE ADDRESS
UNA : UPSTREAM NEIGHBOR ADDRESS
FCS : FRAME CHECK SEQUENCE
FS : FRAME STATUS
FDX : FULL DUPLEX

NEGOTIATION PROTOCOL FOR ESTABLISHMENT OF FULL DUPLEX COMMUNICATION ON A TOKEN RING NETWORK

CROSS-REFERENCE TO RELATED APPLICATIONS

This is a continuation of Ser. No. 07/966,110, filed Oct. 23, 1992, which is a continuation-in-part of Ser. No. 07/893,217, filed Jun. 2, 1992, now abandoned, which is a divisional Ser. No. 07/468,480, filed Jan. 22, 1990, now U.S. Pat. No. 5,155,726. Both of the related applications are entitled "Station-to Station Full Duplex Communication in a Token Ring Local Area Network."

BACKGROUND OF THE INVENTION

This invention relates generally to local area networks (LANs) and, more particularly, to LANs operating on a token ring basis and having stations capable of supporting simultaneous, bidirectional communication. In order to understand the problem addressed by the present invention, it is desirable to have a basic understanding of the system architecture and operation of LANs.

A computer network is simply a collection of autonomous computers connected together to permit sharing of hardware and software resources and sharing of information, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

The primary function of a LAN is to provide a communication channel of relatively high bandwidth and low latency time, through which computers or stations can communicate with each other. The bandwidth is a measure of the ability of the channel to carry information. For example, a channel may have a total bandwidth of 100 megabits per second (Mbits/s). Because each station on the network has only limited access to the channel, a station will typically be able to use only a fraction of this bandwidth, depending on the number of stations that are active. The latency time is a measure of the time needed to gain access to the communication channel. The bandwidth and latency of a network depend on a number of factors, such as the medium used for the communication channel, the speed of the network, the physical extent and topology of the network, the protocols or rules used to control access to the channel, the number of stations connected to the network, and the message traffic on the channel.

As computer networks have developed, various approaches have been used in the choice of communication medium, network topology, message format, protocols for channel access, and so forth. Some of these approaches have emerged as de facto standards, and a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level.

The lowest layer defined by the OSI model is called the physical layer, and is concerned with transmitting raw data bits over the communication channel, and making sure that the data bits are received without error. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that provides communication services to the next layer above, known as the network layer. The data link layer performs such functions as structuring data into packets or frames, and attaching control information to the packets or frames, such as checksums for error detection, and, in some cases, packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) layer. This layer, or sublayer, determines which station should get access to the communication channel when there is competition for it. The functions of the MAC layer are more likely to be dependent on the nature of the transmission medium.

One common network protocol used to determine bus access priority is the token ring. In a token ring network, a set of stations is serially connected by a transmission medium to form a closed loop. Information is transmitted serially, as a stream of symbols or bits, from one active station to the next. Each station usually regenerates and repeats each symbol and also serves as the means for attaching one or more devices to the ring for the purpose of communicating with other devices on the ring. When a station has access to the ring, it transmits information onto the transmission medium, and the information circulates from one station to the next around the ring. A destination address is contained in the transmitted information, and the addressed station recognizes its address and copies the information as it passes on the ring. Finally, the original transmitting station removes the information from the ring.

A station gains the right to transmit its information onto the medium when it detects a token passing on the medium. The token is a control signal, in the form of a unique symbol that is used to schedule transmission. A station that is ready to transmit information may "capture" the token by removing it from the ring. The station may then send one or more frames of information, followed by the token, which again becomes available for capture by another station.

Typical token ring networks use optical fiber, or coaxial cable, or twisted pair cable as the transmission medium. One such network using the token ring protocol, known as the fiber distributed data interface (FDDI), is intended for operation at a bandwidth of 100 megabits per second (Mbits/s) over distances of several kilometers. The media access control (MAC) protocol for the FDDI token ring system is described in an American National Standards Institute document designated ANSI X3.139-1987. The corresponding physical layer protocol for FDDI is defined in ANSI X3.148-1988.

In addition to the layers defined by these standards, an FDDI token ring network also needs a station management protocol, which provides the control necessary at a station level to manage the various layers, such that a station may work cooperatively as a part of the token network. Station management provides services such as connection management, station insertion in and removal from the network, station initialization, configuration management, collection of statistics, and so forth.

In the station management protocol, there is a mechanism for one station to inform its immediate, i.e. logically adjacent, neighbor station of its unique address. Every station periodically executes a neighbor notification protocol, which uses this mechanism, to allow its immediate, downstream neighbor station to maintain an upstream neighbor address (UNA) database. Thus each station in the network knows the unique address of its immediate upstream neighbor station. The terms "upstream" and "downstream" refer to the direction of flow of the token and data in the network. The neighbor notification protocol requires that each station periodically transmit a neighbor identification frame (NIF), which is destined for the immediate downstream neighbor alone, and no other station. The NIF frame contains the source station's unique address and the upstream neighbor address (UNA) that the source station has learned from its upstream neighbor station.

An obvious limitation of network protocols such as the token ring is that the effective bandwidth available to any one station is reduced when many stations are actively connected to the network. If n stations are active, for a best case with no overhead, the effective bandwidth for each is only 1/nth of the channel bandwidth. Another limitation of the token ring network is that it has significant latency time that increases with the size of the network. Before a station can begin transmitting, it must wait for the token to arrive. If the token has just passed, there will be delay time while it is passed around the ring from station to station. The average delay time is the time taken to pass the token around one half of the ring, and depends on the distances between the stations, the number of stations and the message traffic on the ring. Even if no other stations are waiting to transmit, the station wishing to send a frame of data will still have to wait for the token to arrive.

There are some applications in which it would be desirable to provide a point-to-point communication link between computers at a relatively high bandwidth and without the inherent limitations of network protocols such as the token ring. Ideally, it would be desirable for these applications to have full duplex communication between two stations. In the token ring network, only one station can transmit at any time. Therefore, although a number of messages may be circulating simultaneously on the ring, operation of the communication channel formed by the ring is effectively in a half duplex mode. Even if only two stations are connected to the ring, only one can transmit at a time, and the total bandwidth of the ring, which may be 100 Mb/s in each direction, is not being utilized.

If two stations connected to the ring are capable of transmitting and receiving at the same time, they are said to be full duplex stations, but they would be incapable of operating in this mode under the conventional token ring protocol. One solution to this problem is to provide two sets of token ring connections between the two systems, to achieve an aggregate bandwidth of 200 Mb/s. However, this approach is both too costly and complex. Complexity arises because the application and system software will have to manage traffic splitting between the two connections, and load balancing to achieve the desired bandwidth of 200 Mb/s. Another solution to the problem is to provide a dedicated communication channel between the two computers needing full duplex communication, but this is both costly and inconvenient. Dedication of computer equipment or a communication channel to a narrow range of applications is clearly an inefficient use of equipment resources. Moreover, a computer user desiring full duplex connection with another computer would need additional software to connect with the full duplex channel, and would face no small inconvenience in having to disconnect from the network and reconnect to it after the need for full duplex operation was satisfied. Most users would prefer to retain the convenience of ready access to multiple network resources, and tolerate a less than desirable performance for some applications.

The cross-referenced applications disclose a technique in which full duplex communication is established between two stations on a token ring network. The technique first uses neighbor identification frames (NIFs) to determine whether there are only two active stations on the network. If this two-node test is passed, a further negotiation determines whether both stations wish to establish full duplex communication. Finally, once full duplex communication is established, the stations must be capable of returning to the token ring mode of operation if full duplex operation is no longer possible.

In the two-node test disclosed in the cross-referenced applications, each station transmits a NIF to its downstream neighbor, and the NIF contains the identity of the transmitting station's upstream neighbor. Thus, if a first station receives a NIF from a second, upstream neighbor station, and the second station's upstream neighbor is identified in the NIF as the first station, then the first station can conclude that there are only two active stations on the network. Similarly, the second station reaches the same conclusion and the two-node test is completed.

Although this type of two-node test works satisfactorily in most cases, a difficulty can arise if there is a network configuration change while the test is being performed, in which case the test may mistakenly conclude that there are only two active stations on the network.

In the technique disclosed in the cross-referenced applications, negotiation for full duplex communications involved the transmission of a full-duplex request (FDX RQ) frame by the first station, to which the second station responded with a full-duplex acknowledgment (FDX ACK) frame. The second station enters full duplex mode while processing the FDX REQ frame, but the first station does not enter full duplex mode until it receives the FDX ACK frame, which may take a relatively long time. In most token ring systems, including FDDI, there are token ring protocol timers used to recover token ring operation. When a station enters full duplex mode and a second station remains in token ring mode, the second station's token ring protocol timers may react adversely and cause the station to initialize the token ring. The token ring initialization actions will cause the first station to revert back to the token ring mode. This sequence can be repeated, seriously limiting the stations from performing efficient communication over the connection.

Another potential disadvantage of the technique disclosed in the cross-referenced applications is that continual verification of the full duplex mode is made by means of additional acknowledgement frames transmitted by the two stations. While in the full duplex mode, the stations do not test for the two-node condition. If a third node enters the network in a transparent fashion (referred to as "graceful insertion" in FDDI technical papers), the condition may not be detected. This results in a deterioration in communication over the network until the condition is eventually detected and corrected through token ring protocol timers.

It will be appreciated from the foregoing that there is still a need for improvement in techniques for negotiating establishment of full duplex communication in token ring networks. The present invention satisfies this need.

SUMMARY OF THE INVENTION

The present invention resides in improvements in apparatus, and a related method for its operation, for establishing full duplex communication between two computers connected to a token ring network. Briefly, and in general terms, the method of the invention comprises the steps of ascertaining, in each station in a token ring network, whether only two stations are active in the network; if only two stations are active in the network, exchanging signals between the two stations to negotiate the establishment of full duplex communication; and effecting a transition to a full duplex mode of communication between the two stations. The step of ascertaining whether only two stations are active includes determining an upstream neighbor address (UNA), determining a downstream neighbor address (DNA), and generating a two node indicator from the UNA and DNA values.

In accordance with one aspect of the invention, the method further includes continually repeating in each station the step of ascertaining whether only two nodes are active. Therefore, the two node indicator is continually updated. The method also includes continually checking the condition of the two node indicator, both during and after the transition to full duplex mode, and also checking for the presence of other conditions that dictate reverting to token ring mode. If any of these conditions are detected, the process of the invention reverts to the token ring mode of operation.

Another important aspect of the invention is validation of nearest upstream (UNA) and downstream (DNA) addresses during detected configuration changes. The method includes comparing each determined UNA value with the previously determined UNA value, and if the comparing step indicates that the UNA value has changed, validating the DNA value by requiring the determined DNA value to match the previously determined DNA value before generating a true two node indicator. Similarly the method includes validating a UNA value in the event that a determined DNA value does not match the previously determined DNA value. If either the UNA or DNA value is being validated, the two node indicator will remain in a false condition.

The step of exchanging signals to negotiate the establishment of full duplex communication includes transmitting a full duplex (FDX) request frame; upon receipt of an FDX request frame, transmitting an FDX acknowledgment (ACK) frame; upon receipt of an FDX ACK frame for the first time in a negotiation, transmitting an FDX ACK frame followed by a Restricted Token; and upon receipt of a Restricted Token after receiving an FDX request frame or an FDX ACK frame, entering the full duplex mode of communication. At every stage during this exchange of signals, and after full duplex operation is established, conditions are continually checked for a possible reversion to token ring mode.

Viewed from another standpoint, the transition to full duplex operation includes an FDX Request state, during which each station performs the steps of transmitting an FDX request frame and waiting to receive an FDX request frame or an FDX ACK frame; an FDX Confirm state, during which each station performs the steps of transmitting an FDX ACK frame and a Restricted Token, and waiting to receive a Restricted Token; and an FDX Operation state, during which each station performs the steps of completing the transition to full duplex mode upon receipt of a Restricted Token. While in each of these states, the method continually checks for the presence of conditions, including the condition of the two node indicator, which dictate reverting to token ring mode.

In accordance with another aspect of the invention, the step of determining a UNA value includes periodically transmitting from each station a neighbor information frame containing the identity of the station transmitting the frame; receiving a neighbor information frame from an upstream neighbor station; determining from the content of the neighbor information frame whether the frame originated from the immediately upstream neighbor station; and, if so, identifying the immediately upstream neighbor. The step of determining a DNA value includes periodically transmitting a neighbor information frame (NIF) request onto the token ring, with an included transaction identifier; receiving a NIF response having the same transaction identifier as in the NIF request; and identifying the nearest downstream neighbor from a source address contained in the NIF response.

It will be understood that the invention also encompasses apparatus equivalent to the methods discussed above, as defined by the claims following this specification.

It will be appreciated from the foregoing that the present invention represents a significant advance in the field of local area networks, especially of the token ring type. In particular, the invention provides for automatic establishment of full duplex mode between two stations on a token ring network, and automatic reversion to token ring mode in the event of a configuration change or other occurrence of a condition that dictates reversion to token ring mode.

The principal advantage of the invention over its predecessor described in the cross-referenced applications is its extreme robustness, even during configuration changes. In common with its predecessors, the invention provides a high total bandwidth, resulting from an effective doubling of the bandwidth in full duplex operation, a lower latency time for gaining access to the network, and fewer failure modes and error recovery procedures, which are a source of overhead in conventional networks. Other aspects and advantages of the invention will become apparent from the following more detailed description, taken in conjunction with the accompanying drawings.

BRIEF DESCRIPTION OF THE DRAWINGS

FIGS. 9a–9f are formats of frames used to establish and maintain full duplex operation.

DESCRIPTION OF THE PREFERRED EMBODIMENT

Figure 1:
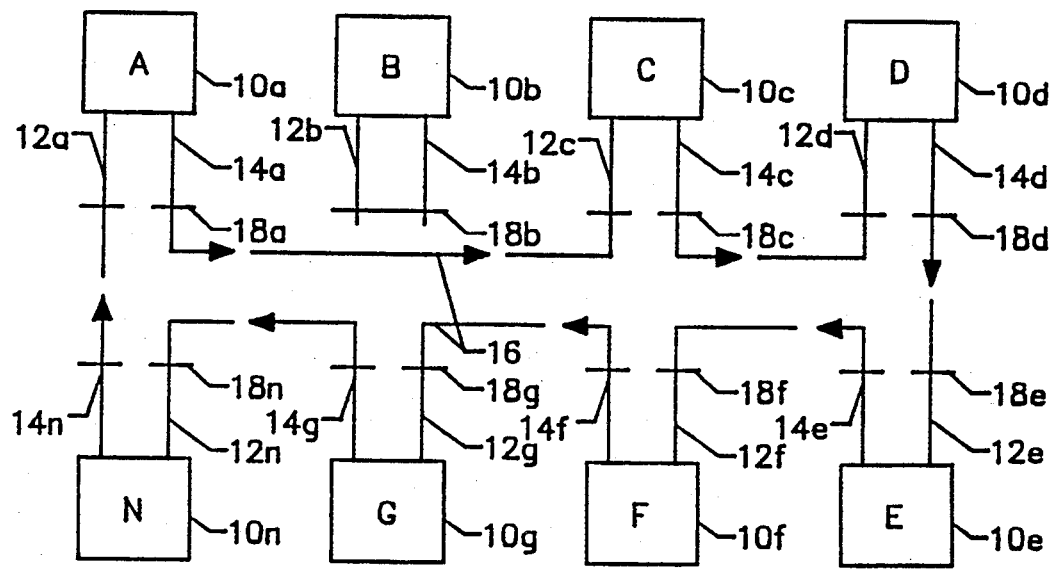
FIG. 1 is a block diagram illustrating the concept of a token ring network.
Figure 1A:
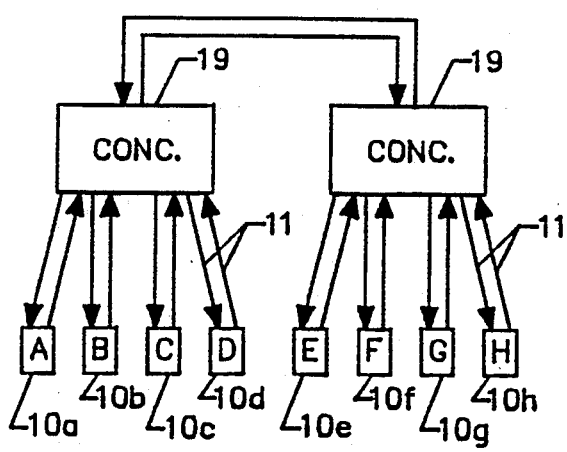
FIG. 1a is a block diagram corresponding to FIG. 1, but showing a more practical configuration of a token ring network using concentrators.

As shown in the drawings by way of illustration, the present invention is concerned with local area networks (LANs) and particularly with LANs in the form of token ring networks. FIG. 1 shows in conceptual form a token ring network having n stations, eight of which are shown, indicated by reference numerals 10a, 10b, 10c, 10d, 10e, 10f, 10g and 10n. Each station has an input port 12a, 12b and so forth, and an output port 14a, 14b and so forth, and these may be connected to a communication medium 16. Each station has associated with it a bypass switch 18a, 18b and so forth, which may be logically closed to isolate the station from the communication medium 16. Although the concept of a bypass switch associated with each station is a useful one for explaining operation of the network, in practice stations are bypassed in a concentrator. As illustrated in FIG. 1a, the stations 10a, 10b and so forth, are more typically connected to one or more concentrators, two of which are shown at 19, by duplex cables 11. The cables may be, for example, duplex fiber optic cables. The bypass switching action is performed within the concentrators 19.

Stations 10 (FIG. 1) that are not bypassed are connected to the medium 16 to form an unbroken ring. The output port of each station is connected through the medium 16 to the input port of the next station. Thus the ring is completed through all of the active stations. By way of conceptual illustration in FIG. 1, the bypass switch 18b for station 10b is shown as closed, isolating station 10b from the network, and all the other bypass switches 18a, 18c–18n are shown as open.

Information is transmitted around the ring from one station 10 to the next, in the form of a stream of symbols or data bits, and each station generally regenerates or repeats the symbols it receives. Each station 10 has a unique address and may have connected to it multiple user devices (not shown) that require access to the network. An example of the format of a frame of data is shown in FIG. 9b. It includes a preamble, various control codes, the data itself, a destination address uniquely identifying the station and user device to receive the data, and a source address uniquely identifying the station and device sending the data. When a station acquires authority to transmit onto the network, the station transmits information onto the ring in this form. Stations located "downstream" of the originating station receive the information and decode the destination address. The destination station recognizes the destination address and not only retransmits the entire frame, but also copies it as it passes. Finally, when the information has traversed the entire ring, the originating station "removes" it by simply not retransmitting the frame onto the ring. Authority to originate a transmission of information onto the ring is carried in a special symbol referred to as the token. A format for a token is shown in FIG. 9a. The token carries no real data, only a special code that uniquely identifies the frame as the token. The token follows each transmission of information, i.e. one or more frames, and is circulated with the information, but with one important exception. The token may be removed by any station wishing to originate a new transmission. A station with nothing to send will simply repeat every received frame, including the token. A station wishing to transmit its own frame will remove or "capture" the token, to temporarily deny access to downstream stations, and will transmit its own frame or frames onto the ring, ending with the transmission of a new token. A timer or other means may be used to limit the time that a station may use the communication medium before passing the token.

As described in the background section of this specification, the token ring network has an inherent latency time, such that any station wishing to transmit will have to wait until the token is received. This latency time increases with the circumferential length of the ring, the number of stations connected to it, and the amount of message traffic on the ring.

Figure 2:
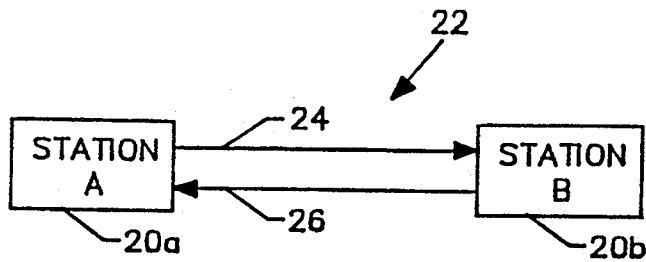
FIG. 2 is a block diagram illustrating physical point-to-point full duplex communication between two stations.

FIG. 2 shows, by way of contrast, two stations 20a, 20b connected together by a duplex cable pair 22, providing physical communication paths 24, 26 in both directions between the two stations. Stations 20a and 20b are physically connected by a full duplex communication path. If the stations themselves are capable of sending and receiving simultaneously, full duplex communication can be established between them. This mode of communication is highly desirable in some situations. Full duplex mode provides a higher bandwidth and completely overcomes any latency delays, since each station may begin transmitting as soon as it has data to send. However, removing stations from a network to physically establish point-to-point full duplex communication is both costly and inconvenient. Physically or manually configuring token ring stations to operate in a point-to-point full duplex communication mode can result in serious impact to an operational token ring when one or both of the stations are connected to a token ring having many other stations. A simpler approach is therefore needed to provide full duplex communication in a token ring network environment.

Figure 3:
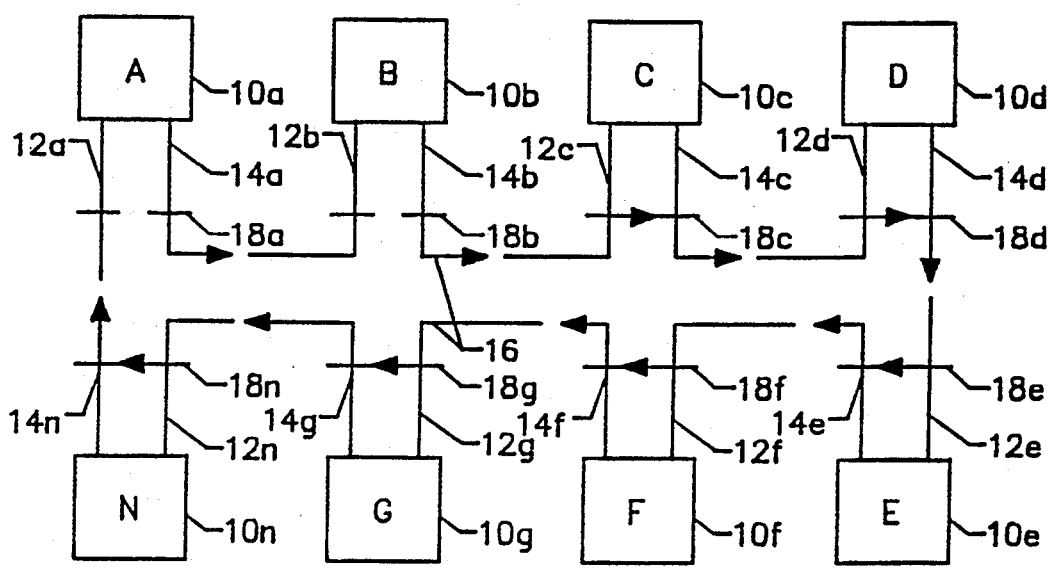
FIG. 3 is a block diagram similar to FIG. 1, showing conceptually how a token ring network might be configured to provide logical point-to-point full duplex communication between two stations.

In accordance with the invention, a token ring network can be automatically reconfigured to operate in full duplex mode without physically reconfiguring the network and without the need for complex additional hardware or software. FIG. 3 shows how the token ring network of FIG. 1 might be logically reconfigured to operate in full duplex mode between two stations 10a and 10b. All of the other stations 10c–10n have their associated bypass switches 18c–18n closed, to isolate the stations from the network. Therefore, the ring medium 16 provides a bidirectional path between the two active stations 10a and 10b. However, if token ring protocols continue to be observed, the configuration shown in FIG. 3 will still not operate in full duplex mode. Only one of the two active stations can have the token at any time. Therefore, only one station can transmit at any time and operation is still only in half duplex mode. As will shortly become apparent, the present invention provides a simple technique for operating the configuration of FIG. 3 in full duplex mode whenever the need arises.

Figure 4:
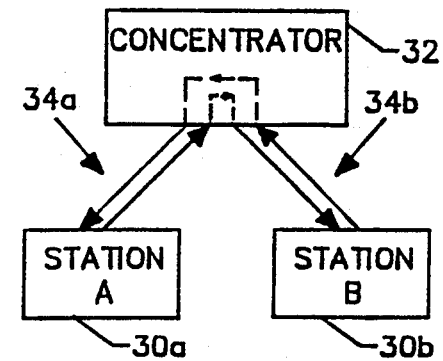
FIG. 4 is a block diagram showing the connection of stations through a concentrator to provide logical point-to-point full duplex communication between the stations.

FIG. 4 is a diagram similar to FIG. 3, but showing two stations 30a, 30b logically connected in full duplex mode through a concentrator 32. Concentrators are used in token ring networks to avoid an inherent weakness of the ring configuration: that a break anywhere in the ring can render the entire network inoperative. As mentioned earlier with reference to FIG. 1a, in a concentrator configuration each station 30a, 30b is connected to the concentrator 32 by its own bidirectional communication channel 34a, 34b. Thus the network has the same apparent topology of a star network, with communication channels radiating out from a central point, but is in fact still a ring network, since the channels 34a, 34b are connected to complete a loop within the concentrator 32. The principle of the present invention applies equally to concentrator configurations like that of FIG. 1a and 4, and to the more easily recognizable ring configuration of FIGS. 1 and 3.

Figure 5:
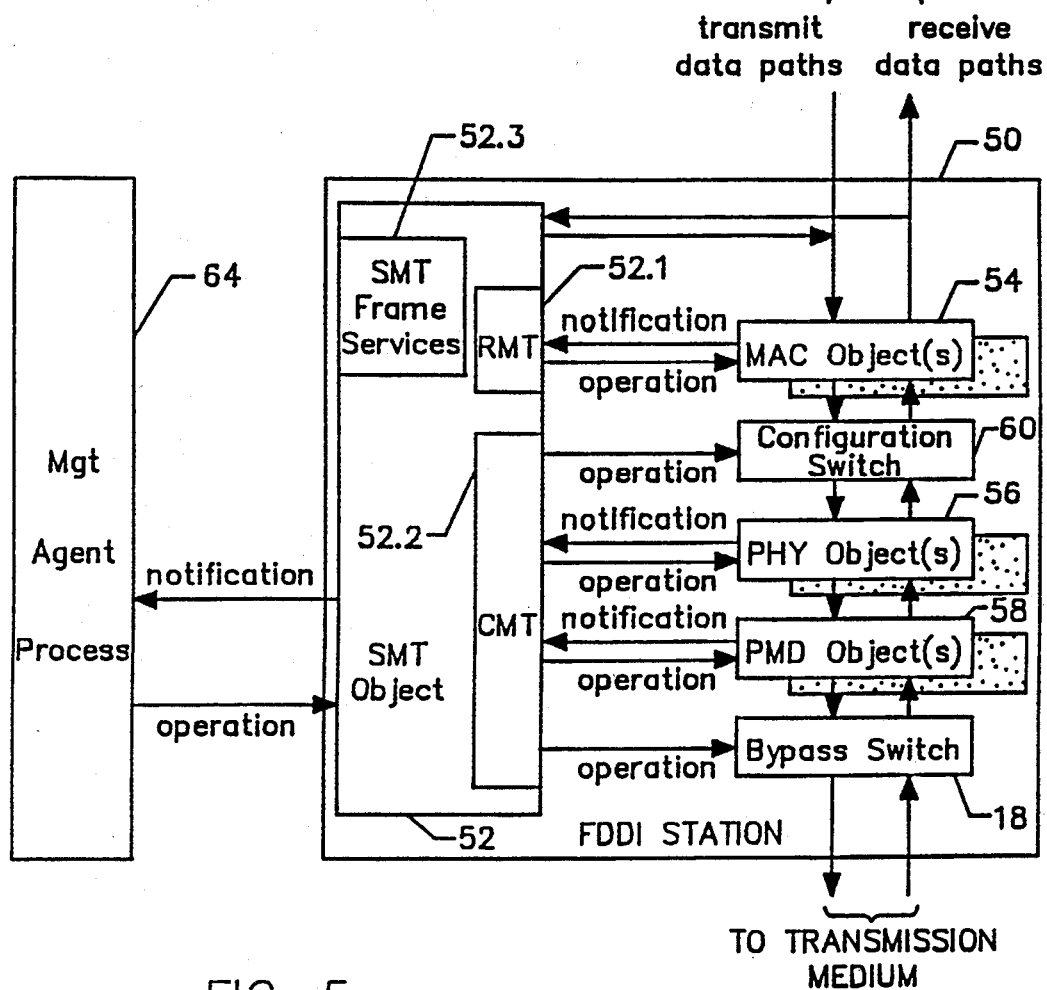
FIG. 5 is a block diagram showing the relationships between a station management protocol and various layers of network architecture.

The functions of the invention now to be described in detail may be integrated into the network architecture in a variety of different ways. As discussed in the background section of this specification, most network architectures are designed in layers conforming in some degree to the International Standards Organization (ISO) Open Systems Interconnection (OSI) reference model. In the (FDDI) network also discussed earlier, there is a station management (SMT) protocol that provides control at a station level to manage operation of the station, including connection management, station insertion and removal, and so forth. Details of the SMT are available in a published draft proposed American National Standard document entitled FDDI Station Management (SMT), designated X3T9.5/84-49, REV. 7.2, Jun. 25, 1992. FIG. 5 shows diagrammatically an FDDI station 50, including a station management (SMT) protocol 52 and some of the lower layers of the network architecture. These include the MAC (media access control) sublayer 54, a physical layer (PHY) 56, and sublayer beneath the physical layer known as the Physical Medium Dependent (PMD) layer 58. These layers are defined in detail in American National Standards ANSI X3,148-1988 and ANSI X3.139-1987.

The Station Management (SMT) entity controls and manages other protocol entities, such as the Media Access Control (MAC) sublayer 54, the physical layer (PHY) 56, the Physical Medium Dependent (PMD) object 58, a configuration switch 60, and the bypass switch 18. Some of the functions and protocols performed by SMT are Ring Management (RMT) 52.1, Connection Management (CMT) 52.2, and SMT Frame Services 52.3. SMT Frame Services include the execution of frame-based protocols, such as the transmission and reception of neighbor information frames (NIFs).

The most convenient way to integrate the functions of the invention into the architecture of a token ring network such as the FDDI, is primarily within the station management protocol 52 and at the MAC sublayer level. However, the invention is not limited to this implementation. For example, it is possible to use a physical-layer-based protocol to ascertain whether or not a two-station configuration exists and whether the two stations are willing to operate in full duplex mode. The connection management (CMT) interface 52.2 in some networks uses physical layer signals to perform link quality tests, exchange topology information, connection type, fault status propagation, and synchronization of the physical link.

In the discussion that follows, it will be assumed that data frames are transmitted and received without error. It will be understood, however, that frames containing detected errors may be ignored or discarded. As will be further described, some frames generated in accordance with the invention will be retransmitted if necessary.

Figure 6:
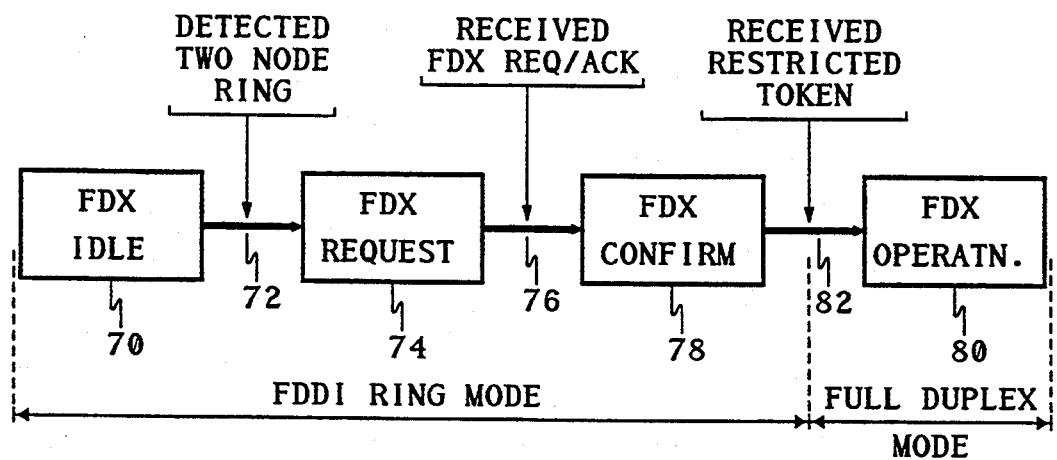
FIG. 6 is a block diagram showing the stages of transition from FDDI token ring mode to full duplex mode.

Transition from FDDI token ring mode to full duplex mode is automatic and completely transparent from a user standpoint. FIG. 6 is an overview of a full duplex autoconfiguration protocol. The protocol has to be fully executed by two stations on a token ring network before full duplex communication can begin. The protocol allows the data link between two stations to configure dynamically and automatically to operate in either the token ring mode or the full duplex mode. In addition, the protocol ensures that each station operating in full duplex mode switches back to the token ring mode when there is a configuration change, such as when a third station joins the ring.

After an initialization phase (not shown in FIG. 6), the station begins its operation in the FDDI token ring mode, as indicated by the FDX Idle state 70. The station then continually executes a two-node test (to be described in detail), which may determine that there are only two active stations on the token ring, as indicated at 72. This determination moves the autoconfiguration status to the FDX Request state, indicated at 74. A station in this state of autoconfiguration transmits an FDX Request onto the ring and waits for an FDX Acknowledgement, or an FDX Request, from the other station on the ring. If this happens, as indicated at 76, the station enters the FDX Confirm state, indicated at 78. During the FDX Confirm state, the stations exchange more protocol messages to synchronize their transitions into the FDX Operation state, indicated at 80.

While in FDX Request state or FDX Confirm state, on reception of the first FDX Ack frame a station initiates a mechanism to signal the other station to enter the full duplex Operation state. In order to avoid adverse interaction with token ring protocol timers (e.g., the TVX timer expiration in FDDI), the second of the two stations must enter the full duplex Operation state within a specified time period after the first of the stations has entered the full duplex Operation state. The specified time period is determined by the token ring protocol timers, such as the TVX timer. For example, the specified time period for FDDI is 2.5 milliseconds, which is the ANSI FDDI standard default value for the TVX timer. When one station enters the full duplex Operation state and the other remains in token ring mode, the station in the full duplex Operation state will no longer repeat a frame or a token. Thus the station in token ring mode will no longer see frames or a token on the ring and, after expiration of the TVX timer, will initialize the token ring.

In most station implementations, processing a receive frame can be subject to a much longer delay than processing an interrupt. (An interrupt is a mechanism for suspending operation of a processor in such a way that it can be resumed at some later time, after performing another operation of higher priority.) For example, an FDX request or ACK frame can be subject to a delay ranging from several milliseconds to hundreds of milliseconds. On the other hand, most interrupt processing, such as of an interrupt to indicate the detection of a Restricted Token, can be accomplished in less than one millisecond. In a typical station implementation, the token ring protocol related interrupts are given relatively higher priority than frame processing, and this limits the time it takes to service an interrupt. The mechanism used in the invention to signal the stations involved to enter the full duplex Operation state makes use of the Restricted Token interrupt and of the property that the interrupt service is guaranteed to complete in less than half the TVX timer value.

As described earlier, while in the FDX Request state or FDX Confirm state, a station initiates the transition into the FDX Operation state on reception of the first FDX Ack frame. The station initiates the transmission of a Restricted Token. The current design uses a MAC chip referred to as DC7109B made by Digital Equipment Corporation (or an identical chip referred to as MM68838 made by Motorola). In order to transmit a Restricted Token, the station implementation instructs the MAC chip to transmit a packet using a Packet Request Header (3-byte field) which specifies to the MAC chip to transmit a Restricted Token on detection and capturing of a token. The Restricted Token traverses the ring and is detected by both of the stations. On detection of the Restricted Token on the ring, the MAC chip generates a Restricted Token interrupt. While the station is in the FDX Confirm state, the Restricted Token interrupt causes the station to enter the FDX Operation state. Thus, the two stations enter the FDX Operation state based on the same Restricted Token. Given that the token ring propagation time is bounded and the station's interrupt processing time is designed to be bounded, the Restricted Token mechanism provides a method to get the two stations to enter the FDX Operation state within a bounded time.

This use of the Restricted Token is unique to the present invention. The ANSI FDDI standard uses the Restricted Token for an entirely different purpose, to provide a restricted or reserved dialogue service. More detail of this use of the Restricted Token can be found in the ANSI FDDI MAC Standard documentation. This invention uses a Restricted Token if, and only if, it is certain that there are only two stations in the ring, and the two stations are willing and able to enter the full duplex mode. Use of the Restricted Token is motivated by the fact that MAC chip selected provides a convenient means for transmitting a Restricted Token, and generates an interrupt on detection of a Restricted Token on the token ring. In addition, the Restricted Token is not used for other purposes while the two stations are trying to enter the full duplex mode. Other mutually agreed upon signals can be used to cause the stations to enter the full duplex mode, so long as they meet the same basic requirements of the invention. Specifically, the agreed upon signals should be convenient to generate, should be rapidly processed when detected, such as by servicing an interrupt, and should be unambiguous, i.e. not used for some other purpose when the two stations are trying to enter the full duplex mode. Other possible methods, not using the Restricted Token, are:

1. Using a special frame to notify and synchronize the two stations to enter the full duplex mode, within a specified bounded time.
2. Using a special signal (e.g., a physical layer signal) that notifies and synchronizes the two stations to enter the full duplex mode within the specified bounded time.

While in the FDX Operation state 80, the two-node test is continually running, as a keep-alive mechanism for the FDX Operation state. If the two-node test fails while the station is in the FDX Operation state, the mode of operation reverts to that of an FDDI ring.

Figure 7A:
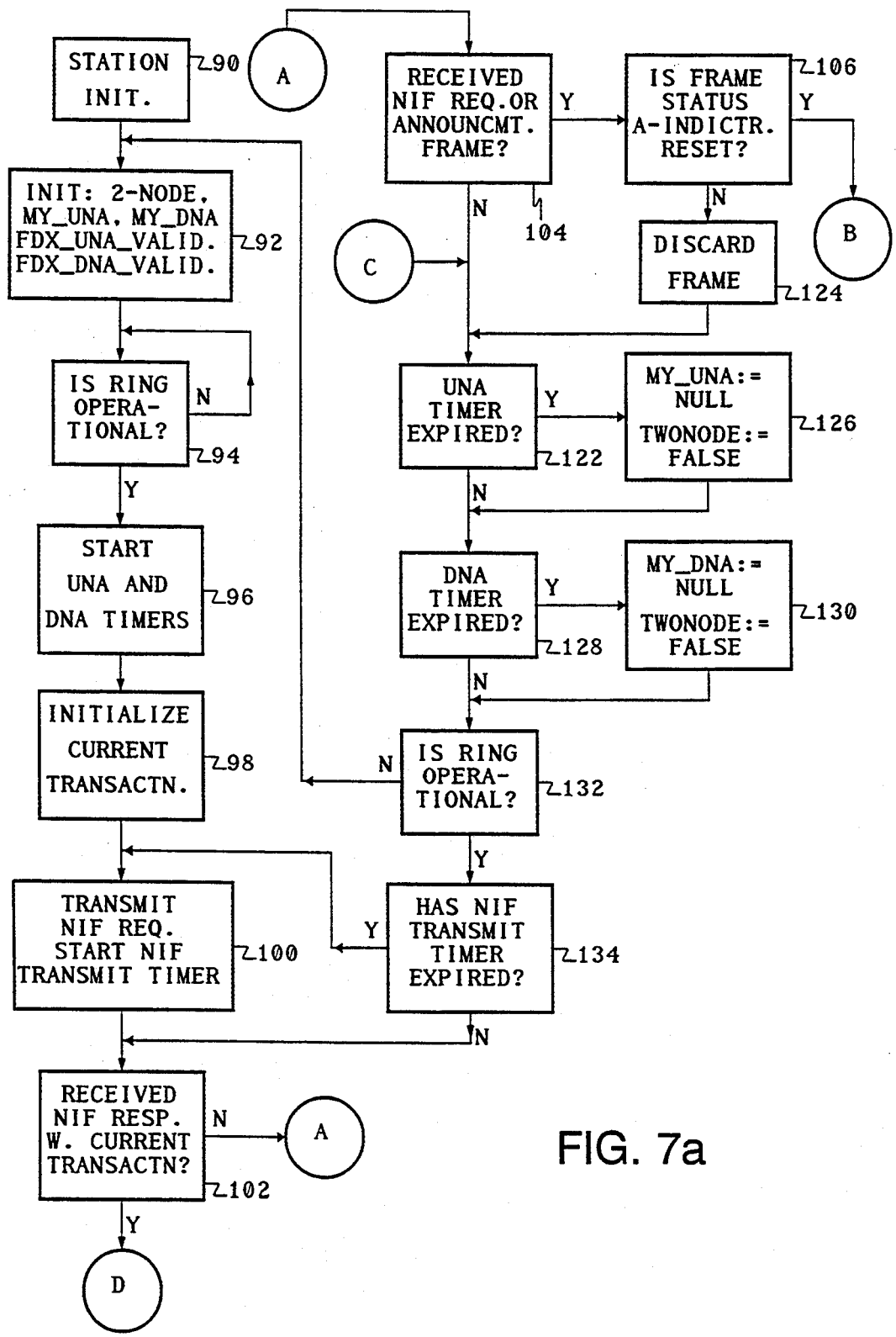
FIGS. 7a–7c together comprise a flowchart depicting the functions performed in a two-station test protocol performed in accordance with the invention.
Figure 7B:
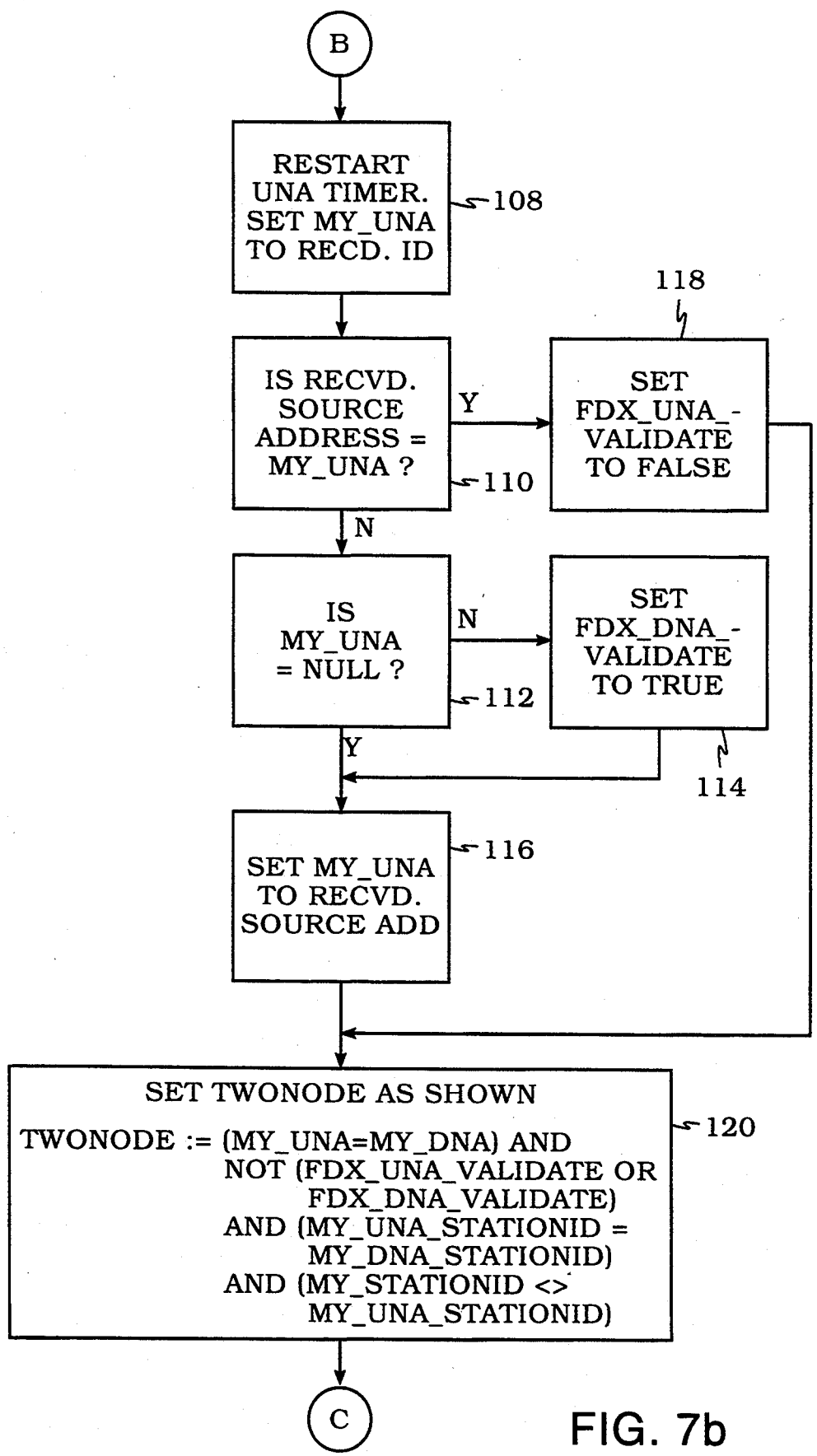
Figure 7C:
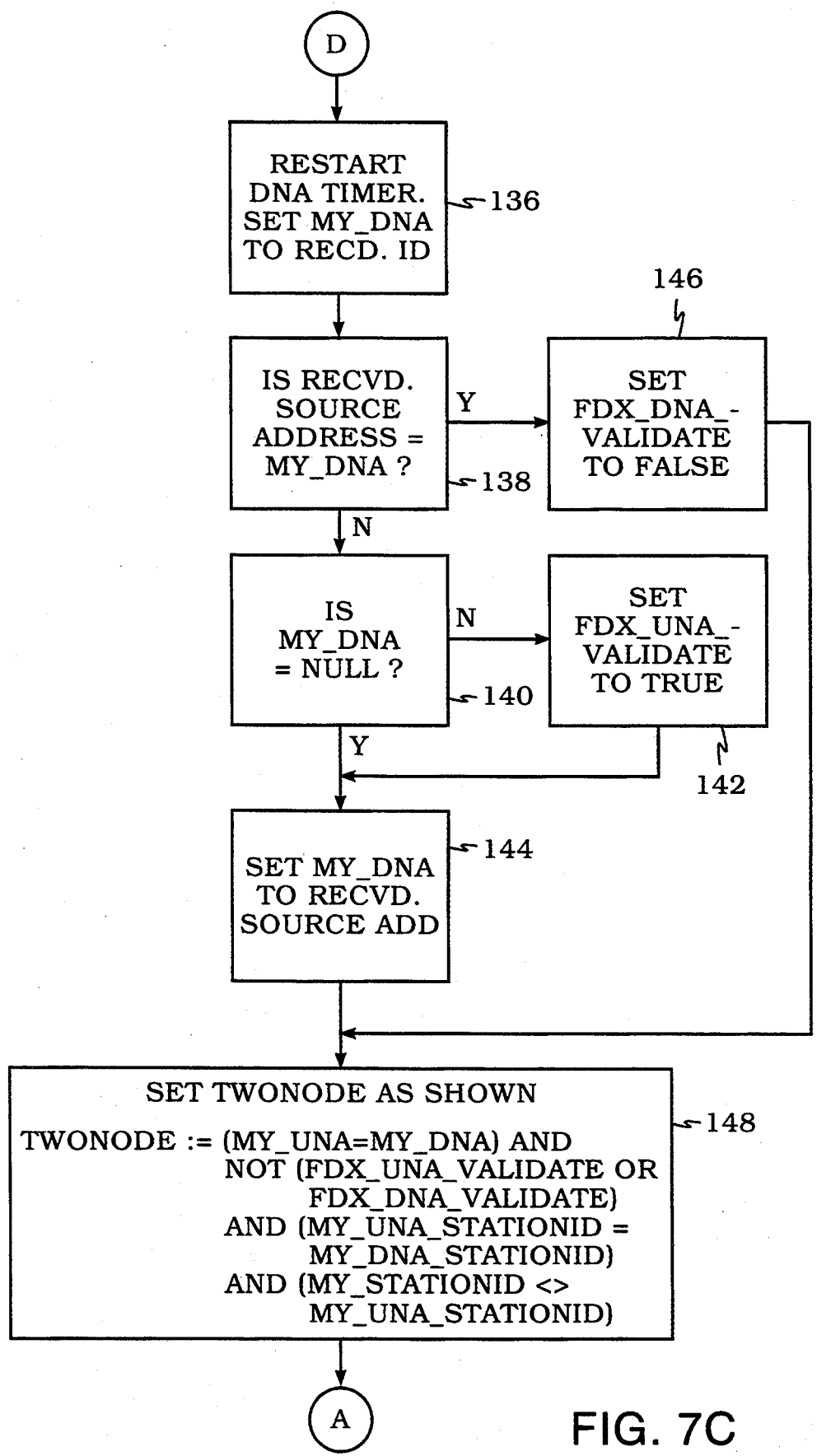
Figure 8A:
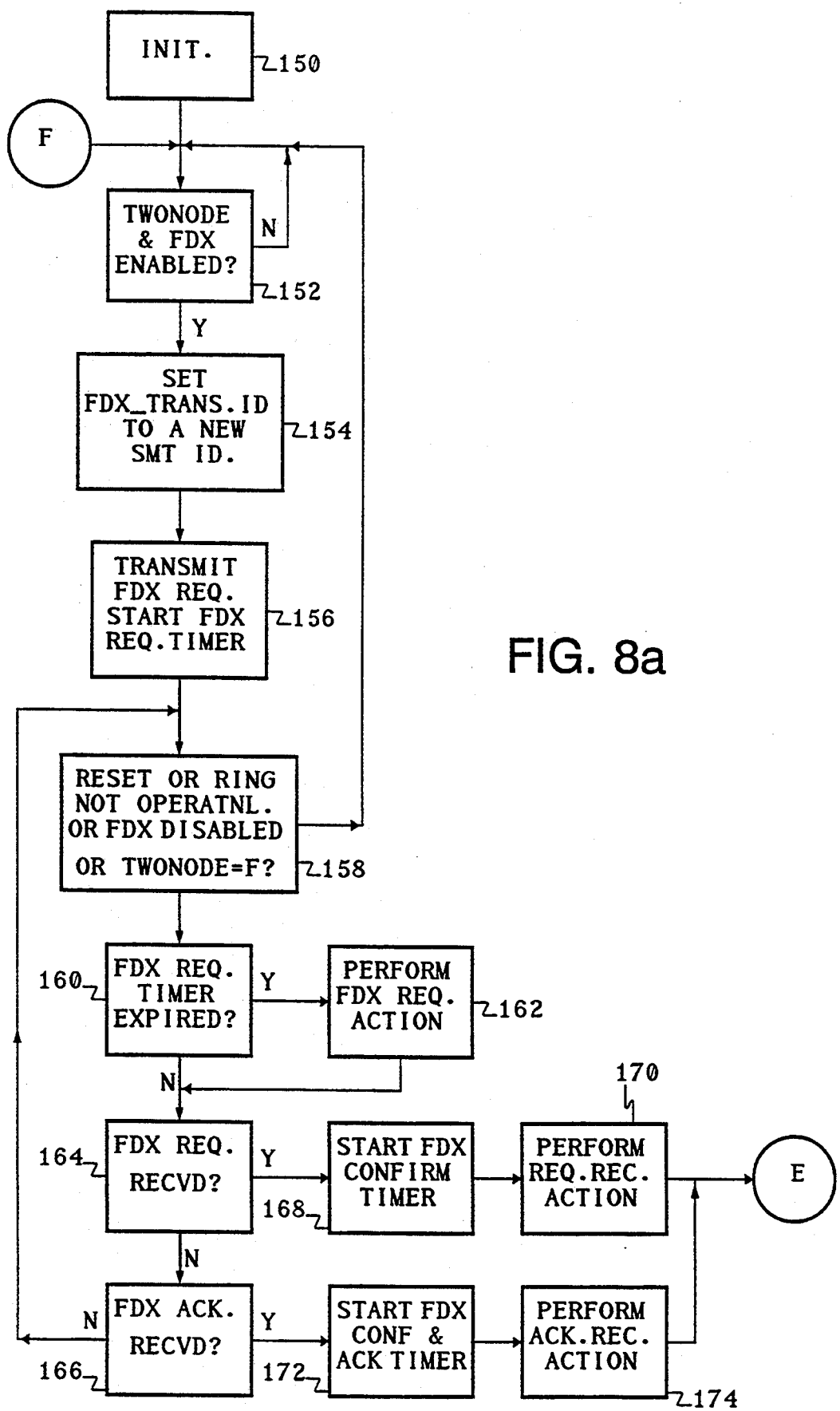
FIGS. 8a–8c together comprise a flowchart depicting the functions performed by a full duplex control algorithm in accordance with the invention.
Figure 8B:
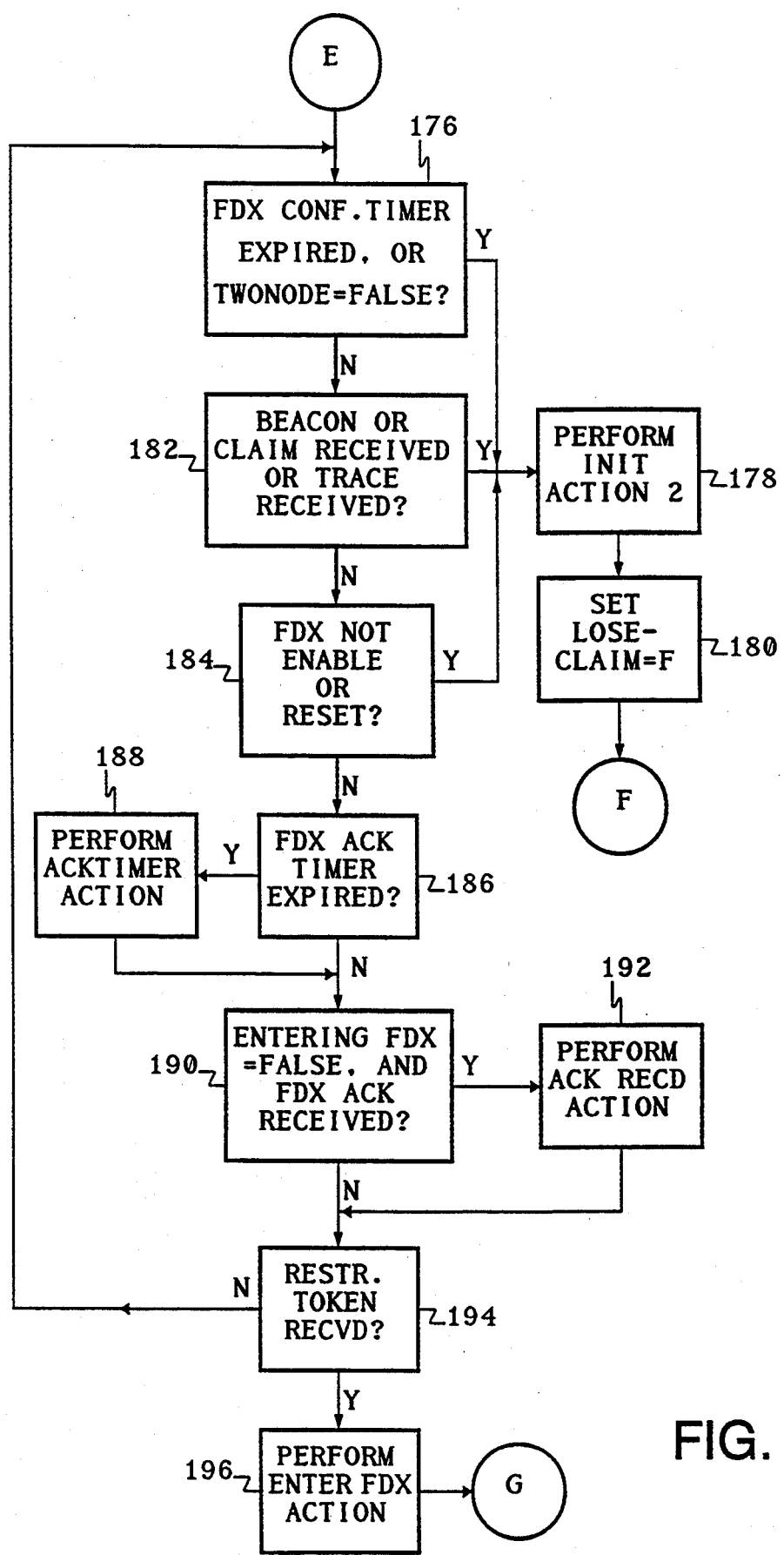
Figure 8C:
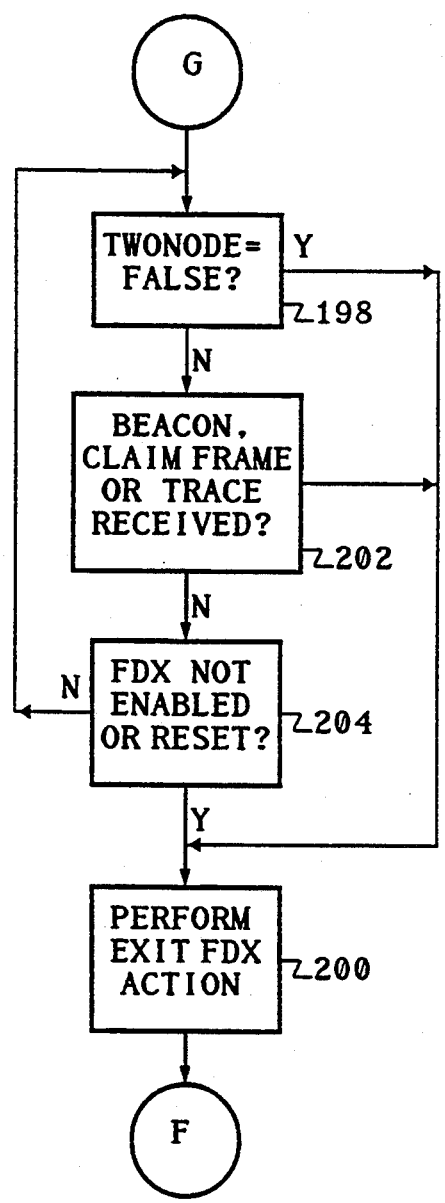

The autoconfiguration protocol for handling transitions between the FDDI token ring mode and the full duplex mode, is implemented as two concurrently executing processes: a two-node test (shown in FIGS. 7a-7c) and a full duplex control protocol (shown in FIGS. 8a-8c). For a more complete explanation of the invention, these processes will now be described in detail.

Definitions

The following variables are used in the two basic processes of the invention, i.e. in the two node test and the full duplex control protocol.

FdxEnable—a binary variable indicating whether full duplex operation is enabled or not (T=enabled, F=disabled)

FdxOp a binary variable that indicates the status of full duplex operation (T=operating in full duplex mode, F=not operating in full duplex mode)

LoseClaim a binary variable that determines whether MAC should do normal Claim process and ring recovery (T=disables Claim winning and ring error recovery, F=enables FDDI Claim process and ring error recovery)

MACFdxMode a binary variable that determines MAC's operational mode (T=full duplex mode, F=token ring mode)

My_UNA my upstream neighbor's address in the LAN

My_DNA my downstream neighbor's address in the LAN

My_UNA_StationID my upstream neighbor's SMT station ID

My_DNA_StationID my downstream neighbor's SMT station ID

Fdx_UNA_Validate a binary flag to indicate that My_UNA needs to be verified because My_DNA has changed (T=My_UNA may have changed, F=My_UNA is okay)

Fdx_DNA_Validate a binary flag to indicate that My_DNA needs to be verified because My_UNA has changed (T=My_DNA may have changed, F=My_DNA is okay)

TwoNode a binary flag to indicate the status of the two node test (T=a two node ring is detected, F=a two node ring is not detected)

EnteringFDX a binary flag indicating transition into full duplex operation; the transition starts on reception of an Fdx Ack frame and ends when a restricted token is received (T=transition into full duplex operation is in progress, F=no transition is in progress)

FdxOp a binary flag indicating the status of full duplex operation (T=operating in the full duplex mode, F=not operating in the full duplex mode)

Two Node Test

FIGS. 7a-7c show the two node test in detail, beginning (in FIG. 7a) with a station initialization procedure, in block 90, and the initialization of some critical station variables. In particular, My_UNA and My_DNA are set to null values initially, and the Fdx_UNA_Valid and the Fdx_DNA_Valid variables are set to False. In addition two-node variable TwoNode is set initially to False. All of this initialization takes place in block 92 of the figure.

The next step after initializing is to determine if the ring is operational (block 94). The process repeats the test in block 94 if the ring is not operational. If the ring is operational, the next step in the process is to start a UNA timer and a DNA timer, as indicated in block 96. These timers are used to define a maximum time for determination of the upstream neighbor address (UNA) and downstream neighbor address (DNA). Then, in block 98, a current transaction identifier is initialized to a new value, and a neighbor information frame (NIF) request is transmitted, as shown in block 100. Concurrently with transmitting the NIF request, a NIF transmit timer is started, to measure a time interval for sending periodic additional NIF requests.

By this point in the process, the station has transmitted a NIF request and is awaiting receipt of a NIF response. The station will determine the identities of its nearest upstream neighbor (UNA) and its nearest downstream neighbor (DNA) by analyzing subsequent NIF requests, announcements and responses that it receives over the token ring.

The mechanism for identifying the UNA is similar to the technique used in the cross-referenced applications, and makes use of a flag known as the A indicator, specified by the MAC standard protocols. As shown in FIG. 9c, each NIF frame (and in fact each frame of any type) includes a frame status (FS) field at the end of the frame. The frame status field includes the A indicator, or Address Recognized indicator. The indicator has possible values of Set and Reset, and is transmitted in the Reset condition by the station that originates the frame. If another station recognizes the destination address in the frame as its own individual or group address, it changes the A indicator to the Set condition. Otherwise a station not recognizing the destination address leaves the A indicator unchanged.

Therefore, when a station transmits a NIF request, which is broadcast to all stations, the next downstream station to receive the request sets the A indicator. More importantly, if a station receives a NIF request with the A indicator reset, the station must be the first to receive the request, and the request must have originated from the upstream neighbor of the station. The source address in the request frame then provides the UNA for the station.

The mechanism for determining the DNA for a station also uses NIF requests, but relies on receiving an appropriate NIF response from the downstream neighbor station. Each NIF frame has a transaction identifier stored in it by the station originating the frame. When a station responds to a NIF request, the NIF response uses the same transaction identifier, so that the response may be correctly associated with the corresponding request. Only the first station to receive a NIF request transmits a response. When the station originating the NIF requests receives a response with the correct transaction identifier, the originating station can then use the source address from the NIF response to identify the DNA.

The basic two node test is satisfied when the UNA and DNA variables are equal in value, i.e. the closest upstream and downstream neighbors are the same. But, as will be described, the test also includes further validity checking to verify that there is a two node condition.

After transmitting a NIF request (block 100), the process checks to see whether a NIF response has been received, containing the current transaction identifier, as indicated in block 102. If such a NIF response has not been received, processing continues in block 104 (through connecting circle A), where a check is made for receipt of a NIF request or a NIF announcement. If one has been received, the frame status A indicator of the received frame is checked (in block 106). If the A indicator is in a Reset condition, then this is the first station to receive the NIF request or announcement. The A indicator is automatically set by a MAC protocol, and the station has now tentatively identified its upstream neighbor. The process continues in block 108 (FIG. 7b, reached through connecting circle B), where the UNA timer is restarted and My_UNA_StationID is set to the station identifier of the received SMT identifier in the NIF request or announcement. The received source address field in the NIF request is compared with the current value of My_UNA, in block 110. If they are not the same, this is an indication that the upstream neighbor has changed, possibly due to a network reconfiguration. If the My_UNA value is not a null (its initial value of all zeros or other predefined value), as determined in block 112, the process assumes that My_UNA has changed and sets a validate flag, Fdx_DNA_Validate, to a True condition, as indicated in block 114. This flag is not changed to a False condition until a newly received My_DNA value matches the currently stored value of My_DNA. The newly determined value for My_UNA is used thereafter, as derived from the received source address (block 116). If the received source address was already the same as My_UNA, as determined in block 110, the Fdx UNA Validate flag is set to a False condition, in block 118, indicating that there has been no change in My_UNA. After updating of My_UNA and one of the flags Fdx_UNA_Validate and Fdx_DNA_Validate, the TwoNode flag is set to an appropriate binary condition, as indicated in the legend accompanying FIG. 7b.

The basic condition determining the status of the TwoNode flag is that My_UNA and My_DNA should be equal. There are three additional conditions that have to be met for TwoNode to remain in the True condition. First, if either of the validate flags, My_UNA_Validate and My_DNA_Validate, is in a True condition, this indicates that a possible reconfiguration was detected and that TwoNode should not be considered True until further validation is performed and the validate flags are both in the False condition. A second condition is that the globally unique station addresses of the upstream and downstream neighbors be identical; i.e. My_UNA_StationID = My_DNA_StationID. The third condition is that My_StationID should not be the same as My_UNA_StationID. This is to exclude the case of a station in loopback mode or a single station on the token ring, in which case the process might otherwise mistakenly conclude that there were two stations because the UNA and DNA values were the same.

After setting the TwoNode flag, in block 120, in accordance with these conditions, the process continues in block 122 of FIG. 7a, through connecting circle C. If the received NIF request or announcement examined in block 106 does not have the A indicator reset, the frame is discarded, as indicated in block 124, and the process continues in block 122, which checks to determine if the UNA timer has expired. If so, My_UNA is set to a null value and the TwoNode flag is set to False, as shown in block 126. Then a check is made, in block 128, to see if the DNA timer has expired. If so, My_DNA is set to a null value and the TwoNode flag is set to False, as indicated in block 130.

After these UNA and DNA timer tests, the ring is checked for operational status, in block 132. If the ring is not operational, the process returns to block 92, to initialize several state variables, and then to continue checking the ring until operational status is attained, as indicated in block 94. If the ring is found to be operational in block 132, a check is made of the NIF timer status, in block 134. If the NIF timer has not yet expired, processing continues in block 102, to make a further check for receipt of a NIF response. If the NIF timer has expired, the process returns to block 100, to transmit another NIF request and reset the NIF transmit timer.

The foregoing description of FIGS. 7a and 7b covers all of the functions of the two node test except the determination of the DNA value, which is shown in FIG. 7c. When a NIF response is received and has the current transaction identifier, as determined in block 102 (FIG. 7b), the process continues with block 136, through connecting circle D. Since a NIF response has been received from the nearest downstream neighbor, block 136 resets the DNA timer and sets My_DNA to the received SMT station identifier. The functions performed in FIG. 7c for DNA determination are closely analogous to those performed in FIG. 7b for UNA processing.

The received source address is compared with the current value of My_DNA, in block 138. If they are not the same, this is an indication that the downstream neighbor has changed, possibly due to a network reconfiguration. If the My_DNA value is not a null (its initial value of all zeros or other predefined value), as determined in block 140, the process assumes that My_DNA has changed and sets a validate flag, Fdx_UNA_Validate, to a True condition, as indicated in block 142. This flag is not changed to a False condition until a newly received My_UNA value matches the currently stored value of My_UNA. The newly determined value for My_DNA is used thereafter, as derived from the received source address (block 144). If the received source address was already the same as My_DNA, as determined in block 138, the Fdx_DNA_Validate flag is set to a False condition, in block 146, indicating that there has been no change in My_DNA. After updating of My_DNA and the flag Fdx_DNA_Validate, the TwoNode flag is set to an appropriate binary condition (block 146), as indicated in the legend accompanying FIG. 7c, and the process continues in block 104, through connecting circle A.

Operation of the two node test process may be summarized as follows. After initialization, each station transmits a NIF request periodically. Then the station determines its nearest upstream neighbor (UNA) from a received NIF request having its A indicator reset, and determines its nearest downstream neighbor (DNA) from a NIF response having a transaction identifier confirming that the response originated from the nearest downstream neighbor. In addition, whenever the two node test process determines that the UNA or the DNA has changed since the last time it was observed, a validity flag is set for the other of the two neighbor addresses, to preclude an erroneous conclusion that there are only two nodes on the token ring. A True value for either validity flag prevents generation of a True value for the TwoNode flag, and will not be cleared to a False value until a newly observed UNA or DNA value matches the previously observed value. The two node test process continually adjusts the value of the TwoNode flag, which in part determines whether a full duplex mode may be entered.

Full Duplex Control Process

As mentioned earlier, the full duplex control process illustrated in FIGS. 8a–8c runs concurrently with the two node test discussed above with reference to FIGS. 7a–7c. After station initialization, indicated by block 150 (FIG. 8a), two threshold tests must be satisfied before advancing the process out of the FDX Idle state. If the TwoNode flag is True, and if full duplex operation is enabled for the station, as determined in block 152, FDX processing may be initiated. If either of these conditions is not true, the process continues to check the conditions and the process remains in the FDX Idle state.

To begin transition to FDX communication, the FDX Request state is entered. First, an FDX transaction identifier is set to a new SMT transaction value (block 154), and then an FDX request frame is transmitted and the FDX request timer is started, as indicated in block 156. Then, as shown in block 158, a number of conditions are tested, any of which could result in a return to the FDX Idle state. The conditions are: the presence of a reset condition, the detection of a non-operational ring status, FDX not enabled, or the TwoNode flag in a False condition. For any of these conditions, the process returns to block 152.

The next part of the full duplex control process is to test for expiration of the FDX timer, as indicated in block 160. If it has expired, an FDX Request Action is performed, as indicated in block 162. This is basically the same action as was performed in block 156. A new FDX Request frame is transmitted with the current SMT transaction identifier, and the Fdx Request Timer is restarted. The presence of blocks 160 and 162 in the process ensures that a new FDX Request will be transmitted periodically.

The process next checks for receipt of an FDX request (in block 164) or an FDX acknowledgment (in block 166). When an FDX request is received, the action taken is to start the FDX Confirm Timer (block 168) and then to perform a Request Received action (block 170). When an FDX Acknowledgment is received, the action taken is to start the FDX Confirm Timer and the FDX Acknowledgment Timer (block 172), and then to perform the Acknowledgment Received action (block 174).

The basic mechanism for making the transition into the full duplex mode requires that the transition be effected for both stations within a bounded time period, to avoid interaction with token ring protocol timers. When in the FDX Request state or the FDX Confirm state, a station initiates the transition to FDX Operation state upon receipt of an FDX Ack frame. The station initiates the transition by transmitting a Restricted Token, which traverses the ring and is detected by both stations. Each station generates a Restricted Token interrupt on detecting the Restricted Token, and the effect of the interrupt is for the station to enter the FDX Operation state. Because the token ring propagation time is bounded, and the station's interrupt processing time is designed to be bounded, both stations will enter the full duplex mode at very close to the same time, before operation of any token ring protocol timer.

More specifically, when an FDX Request is received the FDX Confirm Timer is started (block 168, to limit the time for transition), and the Request Received action (block 170) executes a sequence that includes the following steps:

Transmit an Fdx Ack frame with a new SMT transaction ID;
Start FdxAck Timer;
Set LoseClaim flag to True;
Set EnteringFdx flag to False.

Some of the functions that are specific to the token ring mode of operation may have to be disabled at this point, to make sure that these functions to not interfere with the transition to full duplex mode. A full duplex confirm timer is used to bound the period in which these token ring functions are disabled. An important token ring mode function that has to be disabled involves the action of MAC protocol timers that result in ring initialization in the event that a token or frame is not received within a specified time. Setting the LoseClaim flag to True ensures that these timers are temporarily disabled, to allow a successful transition to full duplex mode without inadvertent interruption.

If an FDX Acknowledgment frame is received the first time, as detected in block 166, FDX Confirm and FDX ACK timers are started (block 172) and the Acknowledgment Received action is performed (block 174). This action includes the steps:

Set the EnteringFdx flag to True;
Set the LoseClaim flag to True;
Transmit an FDX Ack frame with Received TId and with a Packet Request Header to capture any token (nonrestricted or restricted) and then transmit a Restricted Token;
Transmit an FDX Ack frame with Received_TId and with a Packet Request Header to capture any token (nonrestricted or restricted) and then transmit a nonrestricted Token.

The Restricted Token is the mechanism used to initiate transition to the full duplex mode of operation. As will be seen further into the process description, receipt of a Restricted Token by a station in FDX Confirm state results in completion of the transition to full duplex operation. The Packet Request Header is part of the FDX Ack frame in which MAC protocols may be instructed as to which type of Token may be captured. After transmitting the Restricted Token, this action also transmits a nonrestricted Token. Although this action item is not completely necessary for completing the transition to full duplex mode, it maintains the transparency of the transition from a user standpoint. At this stage, in which the station is about to complete the transition to full duplex mode, the two stations may still have message traffic to send in token ring mode, and this traffic could not be transmitted without the presence of a nonrestricted token on the ring.

After performing either the Request Received action (block 170) or the Acknowledgment Received action (block 174), the process continues with block 176 (FIG. 8b, through connecting circle E). The function described in block 176 is to check the FDX Confirm Timer and the status of the TwoNode flag. If the timer has expired, meaning that too much time elapsed before confirmation of the full duplex mode could be obtained, or if the TwoNode flag has returned to a False condition, meaning that there are no longer just two active stations on the token ring, then Init Action Two is performed, as indicated in block 178. Init Action Two includes:

Set My_UNA to The_Unknown_Address (null);
Set My_DNA to The_Unknown_Address;
Set Fdx UNA Validate to False;
Set Fdx DNA Validate to False;
Set TwoNode to False.

After these reinitializing steps, the LoseClaim flag is also set to False (block 180), to allow normal token ring mode operation to begin again, and the process returns to block 152, through connecting circle F, to resume processing in the FDX Idle state.

There are a number of other conditions that can cause operation to revert to the FDX Idle state even if the FDX Confirm Timer has not expired and the TwoNode flag is still True. If a beacon, a claim or a trace frame is received, as determined in block 182, or if FDX Operation is not enabled or is reset, as determined in block 184, the same Init Action Two is performed, in blocks 178 and 180.

If the process is not terminated as a result of any of the tests in blocks 176, 182 or 184, the FDX ACK Timer is next checked, in block 186. If this timer has expired, an Ack Timeout action is performed, as shown in block 188. This action includes transmitting another Fdx Ack frame with the Received_TId, and restarting the Fdx Ack Timer. This action ensures that Fdx Ack frames are transmitted periodically.

Next, the status of a flag referred to as EnteringFdx is tested, in block 190. If the flag is False, and if an Fdx Ack frame was received, an Ack Received action is performed, as indicated in block 192. This action was described with reference to block 174, and results in setting the EnteringFdx flag to True and the transmission of a Restricted Token. The test for the state of EnteringFdx in block 190 ensures that the Ack Received action will be performed only once, either in block 192 or in block 170. The Ack Received function transmits a Restricted Token, and also sets the EnteringFdx flag to True. Therefore, on a subsequent pass through block 190, the Ack Received action in block 192 will not be performed and the process will loop in the FDX Confirm state, waiting to receive a Restricted Token.

The next test performed in the process is to check to determine whether a Restricted Token has been received, as indicated in block 194. If a Restricted Token has not been received, the process returns to block 176, to check whether the FDX Confirm Timer has expired or if the TwoNode flag has become False. The process may continue looping through blocks 76–194 while the station is in the FDX Confirm state. The process reverts to the FDX Idle state upon the detection of certain conditions or when the FDX Confirm Timer expires, or makes a transition to the FDX Operation state when a Restricted Token is received, as detected in block 194.

Entering the FDX Operation state involves performing the Enter FDX action, as indicated in block 196. This action includes:

Set MACFdxMode to True;
Set LoseClaim to False;
Set EnteringFdx to False;
Set FdxOp to True.

After performing these functions, the two stations may begin communicating in full duplex mode, but the full duplex control process does not cease execution. After performing the Enter Fdx action (block 196), the process continues with block 198 (FIG. 8c, through connecting circle G). Block 198 is a further test of the TwoNode flag. If the flag is False, the process performs the Exit Fdx function, as indicated in block 200, and returns to block 152, through connecting circle F, to begin operating in the FDX Idle state again. If the TwoNode flag is True, but a beacon, claim or trace is received, as determined in block 202, the process also exits from FDX Operation state through block 200. Finally, if full duplex operation has not been enabled or has been reset, as determined in block 204, the process returns to block 198 and continues looping on the tests in blocks 198, and 204. The Exit Fdx action in block 200 includes:

Perform Init Action Two (described above);
Set MACFdxMode to False;
Set FdxOp to False;
Initialize MAC to start a Claim process (to begin token ring operation).

The Full Duplex Control process functions as described below in the four basic modes depicted in FIG. 6:

(1) In the FDX Idle state, the process makes sure that there are only two active stations and that there are no other conditions that would preclude operation in full duplex mode.

(2) In the FDX Request state, the process periodically transmits an FDX request and checks for FDX requests or FDX acknowledgments (FDX ACK) received. Reception of an FDX request indicates that the neighbor station has also detected a two node configuration and is capable of full duplex operation. When the process detects receipt of an FDX request frame, it transmits an FDX ACK frame and enters the FDX Confirm state.

(3) In the FDX Confirm state, the process waits for confirmation of the other station's readiness to enter full duplex mode. When an FDX ACK has been received, the process transmits a Restricted Token and waits for receipt of a Restricted Token, at which time the FDX Operation state is entered. During the FDX Confirm state, the process also checks for conditions that dictate reversion to the FDX Idle state.

(4) In the FDX Operation state, full duplex communication can take place between the stations, but the process continues to check for conditions that dictate reversion to the FDX Idle state.

It will be understood from this description that optimum operation of the invention depends in part on the values selected for various timers. Preferred settings of timers relating to the Two Node Test process, such as the NIF transmit timer referred to in FIG. 7a, can be found in the published draft of proposed American National Standard document entitled FDDI Station Management (SMT), designated X3T9.5/84–49, REV. 7.2, Jun. 25, 1992. In addition, there are three timers relating to the Full Duplex Control process that are important to optimum operation of the invention: the FDX Request Timer, the FDX ACK Timer, and the FDX Confirm Timer. The FDX Request Timer maintains the interval for transmission of FDX Request frames, and its presently preferred value is one second. The FDX ACK Timer maintains the interval for transmission of FDX ACK frames, and its presently preferred value is 500 milliseconds. The FDX Confirm Timer maintains the time for staying in the FDX Confirm state, and its presently preferred value is three seconds. It will be understood that these and other timer values may have to be adjusted to achieve optimum performance when implementing the invention in the context of a specific product design.

Conclusion

It will be understood from the foregoing description of the Two Node Test process and the Full Duplex Control process that these two processes automatically effect a transition from token ring mode to full duplex mode whenever there are two stations on the token ring and both stations have full duplex operation enabled. The approach of the present invention is extremely reliable and robust, in that it continually checks for conditions that would require reversion to token ring mode, both while in full duplex mode and during the transition from token ring mode to full duplex mode. Specifically, because the Two Node test is running continuously, it provides a continuous indication of whether there are only two active stations on the ring. As soon as the TwoNode flag becomes False, the Full Duplex Control process reverts to the token ring mode of operation. The invention also includes an improved process for detecting a two node configuration, using both an upstream neighbor address (UNA) and a downstream neighbor address (DNA). The two node test includes a feature that avoids a possible premature transition to full duplex mode in the event of a network configuration change. When a change in either UNA or DNA is detected, the two node test requires validation of the other of these values before a two node condition is declared.

From the foregoing, it will be appreciated that the present invention represents a significant advance in the field of local area networks. In particular, the invention provides for a robust and automatic transition to full duplex operation of two stations connected to a token ring network, when no other stations are active in the network. It will also be appreciated that, although an illustrative embodiment of the invention has been described in detail, various modifications may be made without departing from the spirit and scope of the invention. Accordingly, the invention is not to be limited except as by the appended claims.

We claim:

1. A method for establishing full duplex operation between two stations in a token ring network, the method comprising the steps of:
   exchanging messages between the two stations to confirm that there are no other stations on the network and that the two stations agree to switch to full duplex mode;
   exchanging messages between the two stations to begin a transition to full duplex mode, including transmitting from at least one of the stations an agreed upon signal; and
   completing the transition to full duplex mode upon receipt and processing of the agreed upon signal in both stations, to complete the transition in both stations within a bounded time period, to minimize the possibility of return to token ring mode in either station.

2. A method as defined in claim 1, and further comprising the steps of:
   continually checking, during and after the transition to full duplex mode, for the presence of conditions, including a condition indicating the presence of more than two stations on the network, which conditions dictate leaving full duplex mode; and
   leaving full duplex mode and entering token ring mode of operation upon detection of any of the conditions in the continually checking step.

3. A method for establishing and maintaining full duplex operation between two stations in a token ring network, the method comprising the steps of:
   ascertaining, in each station in a token ring network, whether only two stations are active in the network, wherein the step of ascertaining whether only two stations are active includes,
   determining an upstream neighbor address (hereinafter UNA),
   determining a downstream neighbor address (hereinafter DNA), and
   generating a two node indicator from the UNA and DNA values;
   if only two stations are active in the network, exchanging signals between the two stations to negotiate the establishment of full duplex communication; and
   effecting a transition to a full duplex mode of communication between the two stations.

4. A method as defined in claim 3, and further comprising the steps of:
   continually repeating in each station the step of ascertaining whether only two nodes are active, wherein the two node indicator is continually updated;
   continually checking, during and after the transition to full duplex mode, for the presence of conditions, including the condition of the two node indicator, which dictate leaving full duplex mode; and
   leaving full duplex mode and entering token ring mode of operation upon detection of any of the conditions in the continually checking step.

5. A method as defined in claim 3, wherein the step of ascertaining whether only two stations are active, further includes:
   comparing each determined UNA value with the previously determined UNA value;
   if the comparing step indicates that the UNA value has changed, validating the DNA value by requiring the determined DNA value to match the previously determined DNA value before generating a true two node indicator; and
   similarly validating a UNA value in the event that a determined DNA value does not match the previously determined DNA value.

6. A method as defined in claim 3, wherein the step of exchanging signals to negotiate the establishment of full duplex communication includes:
   transmitting a full duplex (hereinafter FDX) request frame;
   upon receipt of an FDX request frame, transmitting an FDX acknowledgment (hereinafter ACK) frame;
   upon receipt of an FDX ACK frame for the first time in a negotiation, transmitting an FDX ACK frame followed by a Restricted Token; and
   upon receipt of a Restricted Token, entering the full duplex mode of communication.

7. A method as defined in claim 3, wherein the transition to full duplex operation includes:
   an FDX Request state, during which each station performs the steps of transmitting an FDX request frame and waiting to receive an FDX request frame of an FDX ACK frame;
   an FDX Confirm state, during which each station performs the steps of transmitting an FDX ACK frame and a Restricted Token, and waiting to receive a Restricted Token; and
   an FDX Operation state, during which each station performs the steps of completing the transition to full duplex mode upon receipt of a mutually agreed upon signal.

8. A method as defined in claim 7, wherein the mutually agreed upon signal is a Restricted Token.

9. A method as defined in claim 7, wherein the mutually agreed upon signal is a special frame.

10. A method as defined in claim 7, and further comprising the steps of:
    continually repeating in each station the step of ascertaining whether only two nodes are active, wherein the two node indicator is continually updated;
    continually checking, during the FDX Request state, the FDX Confirm state and the FDX Operation state, for the presence of conditions, including the condition of the two node indicator, which dictate reverting to token ring mode; and
    reverting to the token ring mode of operation upon detection of any of the conditions in the continually checking step.

11. A method as defined in claim 3, wherein the step of determining a UNA value includes:
    periodically transmitting from each station a neighbor information frame containing the identity of the station transmitting the frame;
    receiving a neighbor information frame from an upstream neighbor station;
    determining from the content of the neighbor information frame whether the frame originated from the immediately upstream neighbor station; and, if so,
    identifying the immediately upstream neighbor.

12. A method as defined in claim 3, wherein the step of determining a DNA value includes:

periodically transmitting a neighbor information frame (hereinafter NIF) request onto the token ring, with an included transaction identifier;

receiving a NIF response having the same transaction identifier as in the NIF request; and identifying the nearest downstream neighbor from a source address contained in the NIF response.

13. Apparatus for establishing and maintaining full duplex operation between two stations in a token ring network, the apparatus comprising:

means for ascertaining, in each station in a token ring network, whether only two stations are active in the network, wherein the means for ascertaining whether only two stations are active includes means for determining an upstream neighbor address (hereinafter UNA), means for determining a downstream neighbor address (hereinafter DNA), and means for generating a two node indicator from the UNA and DNA values;

means fully operative if only two stations are active in the network, for exchanging signals between the two stations to negotiate the establishment of full duplex communication; and means for effecting a transition to a full duplex mode of communication between the two stations.

14. Apparatus as defined in claim 13, and further comprising:

means for continually initiating operation of the means for ascertaining whether only two nodes are active, wherein the two node indicator is continually updated;

means for continually checking, during and after the transition to full duplex mode, for the presence of conditions, including the condition of the two node indicator, which dictate reverting to token ring mode; and means for initiating reversion to the token ring mode of operation upon detection of any of the conditions by the means for continually checking.

15. Apparatus as defined in claim 13, wherein the means for ascertaining whether only two stations are active, further includes:

means for comparing each determined UNA value with the previously determined UNA value;

means operative only if the UNA value has changed, for validating the DNA value by requiring the determined DNA value to match the previously determined DNA value before generating a true two node indicator; and similar means for validating a UNA value in the event that a determined DNA value does not match the previously determined DNA value.

16. Apparatus as defined in claim 13, wherein the means for exchanging signals to negotiate the establishment of full duplex communication includes:

means for transmitting a full duplex (hereinafter FDX) request frame;

means operative upon receipt of an FDX request frame, for transmitting an FDX acknowledgment (hereinafter ACK) frame;

means operative upon receipt of an FDX ACK frame for the first time in a negotiation, for transmitting an FDX ACK frame followed by a Restricted Token; and means operative upon receipt of a Restricted Token, for entering the full duplex mode of communication.

17. Apparatus as defined in claim 13, wherein the transition to full duplex operation in each station includes:

an FDX Request state, during which the station has active means for transmitting an FDX request frame and means for waiting to receive an FDX request frame of an FDX ACK frame;

an FDX Confirm state, during which the station has active means for transmitting an FDX ACK frame and a Restricted Token, and means for waiting to receive a Restricted Token; and an FDX Operation state, during which each station has active means for completing the transition to full duplex mode upon receipt of a Restricted Token.

18. Apparatus as defined in claim 17, and further comprising:

means for continually repeating in each station the step of ascertaining whether only two nodes are active, wherein the two node indicator is continually updated;

means for continually checking, during the FDX Request state, the FDX Confirm state and the FDX Operation state, for the presence of conditions, including the condition of the two node indicator, which dictate reverting to token ring mode; and means for reverting to the token ring mode of operation upon detection of any of the conditions in the means for continually checking.

19. Apparatus as defined in claim 13, wherein the means for determining a UNA value includes:

means for periodically transmitting from each station a neighbor information frame containing the identity of the station transmitting the frame;

means for receiving a neighbor information frame from an upstream neighbor station;

means for determining from the content of the neighbor information frame whether the frame originated from the immediately upstream neighbor station; and, if so, means for identifying the immediately upstream neighbor.

20. Apparatus as defined in claim 13, wherein the means for determining a DNA value includes:

means for periodically transmitting a neighbor information frame (hereinafter NIF) request onto the token ring, with an included transaction identifier;

means for receiving a NIF response having the same transaction identifier as in the NIF request; and means for identifying the nearest downstream neighbor from a source address contained in the NIF response.

* * * * *